(12) United States Patent
Salkini et al.

(10) Patent No.: US 11,064,359 B2
(45) Date of Patent: *Jul. 13, 2021

(54) INTELLIGENT NETWORK ACCESS CONTROLLER AND METHOD

(71) Applicant: Tecore, Inc., Hanover, MD (US)

(72) Inventors: Jay Salkini, Columbia, MD (US); Thomas Joseph, Lothian, MD (US)

(73) Assignee: Tecore, Inc., Hanover, MD (US)

( * ) Notice: Subject to any disclaimer, the term of this patent is extended or adjusted under 35 U.S.C. 154(b) by 218 days.

This patent is subject to a terminal disclaimer.

(21) Appl. No.: 16/104,925

(22) Filed: Aug. 19, 2018

(65) Prior Publication Data

US 2019/0069181 A1 Feb. 28, 2019

Related U.S. Application Data

(63) Continuation of application No. 15/378,092, filed on Dec. 14, 2016, now Pat. No. 10,057,774, which is a
(Continued)

(51) Int. Cl.
*H04W 12/08* (2021.01)
*H04W 48/04* (2009.01)
(Continued)

(52) U.S. Cl.
CPC ......... *H04W 12/08* (2013.01); *H04L 63/0272* (2013.01); *H04L 63/08* (2013.01); *H04L 63/0876* (2013.01); *H04L 63/10* (2013.01); *H04W 4/14* (2013.01); *H04W 4/90* (2018.02); *H04W 24/08* (2013.01); *H04W 48/04* (2013.01); *H04W 60/02* (2013.01); *H04W 72/10* (2013.01); *H04W 84/005* (2013.01); *H04W 88/02* (2013.01); *H04W 88/12* (2013.01)

(58) Field of Classification Search
CPC ......... H04W 12/08; H04W 4/90; H04W 4/14; H04W 24/08; H04W 60/02; H04W 72/10; H04W 48/04; H04W 84/005; H04W 88/02; H04W 88/12; H04L 63/0272; H04L 63/0876; H04L 63/10; H04L 63/08
USPC .......................................................... 726/4
See application file for complete search history.

(56) References Cited

U.S. PATENT DOCUMENTS

| | | | |
|---|---|---|---|
| 6,725,056 B1 * | 4/2004 | Moles | H04M 7/1225 455/524 |
| 7,325,250 B1 * | 1/2008 | Barclay | H04W 12/08 380/247 |

* cited by examiner

*Primary Examiner* — Mohammad W Reza

(57) ABSTRACT

A wireless communications system operating in a coverage area of a wireless network includes a radiofrequency (RF) front end and a base station coupled to the RF front end, the base station receiving signals data from received transmissions from wireless devices; and a non-transitory computer readable storage medium having encoded thereon a program of machine instructions executable by a processor in signal communication with the base station. The processor executes the instructions to receive from the base station, the received signals data, process the received signals data to determine a characteristic of the wireless device, determine, based on the characteristic, whether the wireless device is allowed to continue transmissions in the wireless network, controlling the base station to lock the wireless device to the base station when continued transmissions are not allowed, and redirecting the wireless device to attempt access to the wireless network when continued transmissions are allowed.

20 Claims, 7 Drawing Sheets

Related U.S. Application Data continuation of application No. 15/072,984, filed on Mar. 17, 2016, now Pat. No. 9,526,021, which is a continuation of application No. 13/939,403, filed on Jul. 11, 2013, now Pat. No. 9,295,071, which is a continuation of application No. 13/507,675, filed on Jul. 19, 2012, now Pat. No. 8,509,740, which is a continuation of application No. 12/318,020, filed on Dec. 19, 2008, now Pat. No. 8,437,741.

(51) Int. Cl.
*H04W 4/90* (2018.01)
*H04L 29/06* (2006.01)
*H04W 72/10* (2009.01)
*H04W 24/08* (2009.01)
*H04W 60/02* (2009.01)
*H04W 4/14* (2009.01)
*H04W 88/02* (2009.01)
*H04W 88/12* (2009.01)
*H04W 84/00* (2009.01)

INTELLIGENT NETWORK ACCESS CONTROLLER AND METHOD

RELATED APPLICATIONS

This application is a continuation of and claims priority to U.S. patent application Ser. No. 15/378,092, entitled "Intelligent Network Access Controller and Method," filed Dec. 14, 2016, which is a continuation of and claims priority to U.S. patent application Ser. No. 15/072,984, now U.S. Pat. No. 9,526,021, entitled "Intelligent Network Access Controller and Method," filed Mar. 17, 2016, which is a continuation of and claims priority to U.S. patent application Ser. No. 13/939,403, now U.S. Pat. No. 9,295,071, entitled "Intelligent Network Access Controller and Method," filed Jul. 11, 2013, which is a continuation of and claims priority to U.S. patent application Ser. No. 13/507,675, now U.S. Pat. No. 8,509,740, entitled "Intelligent Network Access Controller and Method," filed Jul. 19, 2012, which is a continuation of and claims priority to U.S. patent application Ser. No. 12/318,020, now U.S. Pat. No. 8,437,741, entitled "Intelligent Network Access Controller and Method," filed Dec. 19, 2008. The disclosures of these applications are hereby incorporated by reference in their entirety.

TECHNICAL FIELD

The technical field is wireless communications.

BACKGROUND

A key performance indicator of any wireless network is coverage. In addition to providing an evolving set of features to customers, the most successful wireless networks are those that provide ubiquitous coverage and service to as broad a base of subscribers as possible. Because of the emphasis on coverage, these same networks seldom, if ever, provide methods of restricted or controlled access for targeted areas in the network. However, with heightened security concerns, and for other reasons, targeted wireless access restriction may be an important consideration, especially in a localized area, and/or for specific time periods.

SUMMARY

An intelligent network access controller for use within a targeted area or areas provides communications services across some or all relevant wireless technologies and spectrums to subscribers having wireless communications devices. The controller produces the targeted coverage area, wherein wireless access limitations may be enabled by using interfaces for receiving and sending digital messaging by the wireless communications devices; an identification module that determines an identity of a wireless communications device; an access module that receives the identity and determines an access level for the wireless communications device; and a locking module that implements logic that accepts, releases, or allows service to selected wireless communications devices to the controller based on the determined access level.

An intelligent network access controller coupled to wireless communication hardware controls wireless communications in a targeted coverage area of a local wireless network overlaying an existing wireless network. The controller controls the hardware to provoke wireless devices within the targeted coverage area of the local wireless network to attempt to register with the intelligent network access controller; receives, through the hardware, registration signals and identification information from the wireless devices; locks the wireless devices to the intelligent network access controller; determines an access category for each of the wireless devices based on the received registration signals and identification information; maintains first access category wireless devices locked to the controller while the first access category wireless devices remain in the targeted coverage area of the local wireless network; and unlocks second category wireless devices by controlling the hardware to signal the second access category wireless devices to attempt access to the existing wireless network.

DESCRIPTION OF THE DRAWINGS

The detailed description refers to the following figures in which like numerals refer to like items, and in which.

DETAILED DESCRIPTION

A key performance indicator of any wireless network is coverage. The most successful wireless networks are those that have ever-expanding coverage, independent of time, to provide ubiquitous service to any and all subscribers and roaming users. Because of the emphasis on coverage, these same networks seldom, if ever, operate so as to restrict access. However, with heightened security concerns, and for other reasons, wireless access restriction may be an important consideration, especially in a localized area, and/or for specific time periods.

Current systems that impose some type of wireless access restriction function may employ jamming equipment to block wireless signals in a particular area. Other systems rely on shutdown of a cell or sector. These current wireless access restriction solutions do not discriminate among users. Instead, these solutions impose a total prohibition on wireless communications. Furthermore, these current solutions are complicated and expensive to invoke. Finally, with these current solutions, if a situation requires that certain personnel (e.g., emergency response personnel) be able to communicate using wireless communications, a secondary communications network must be established since jamming or cell shutdown prohibits all wireless communications for a given wireless technology.

In most cases jamming works across a spectrum of radio frequencies and jams the use of the entire spectrum regardless of the wireless technology or technologies deployed in the spectrum. So in the case of jamming, a localized communications network must be established on its own technology, unique devices, and spectrum further complicating the setup and operations.

Another challenge is that in most areas covered by wireless communications there are typically multiple technologies operating in a variety of spectrum ranges. Jamming solutions and cell turn down are absolute solutions that do not provide the ability to select on a device by device basis the ability to use the wireless communication within the target area.

Figure 1:
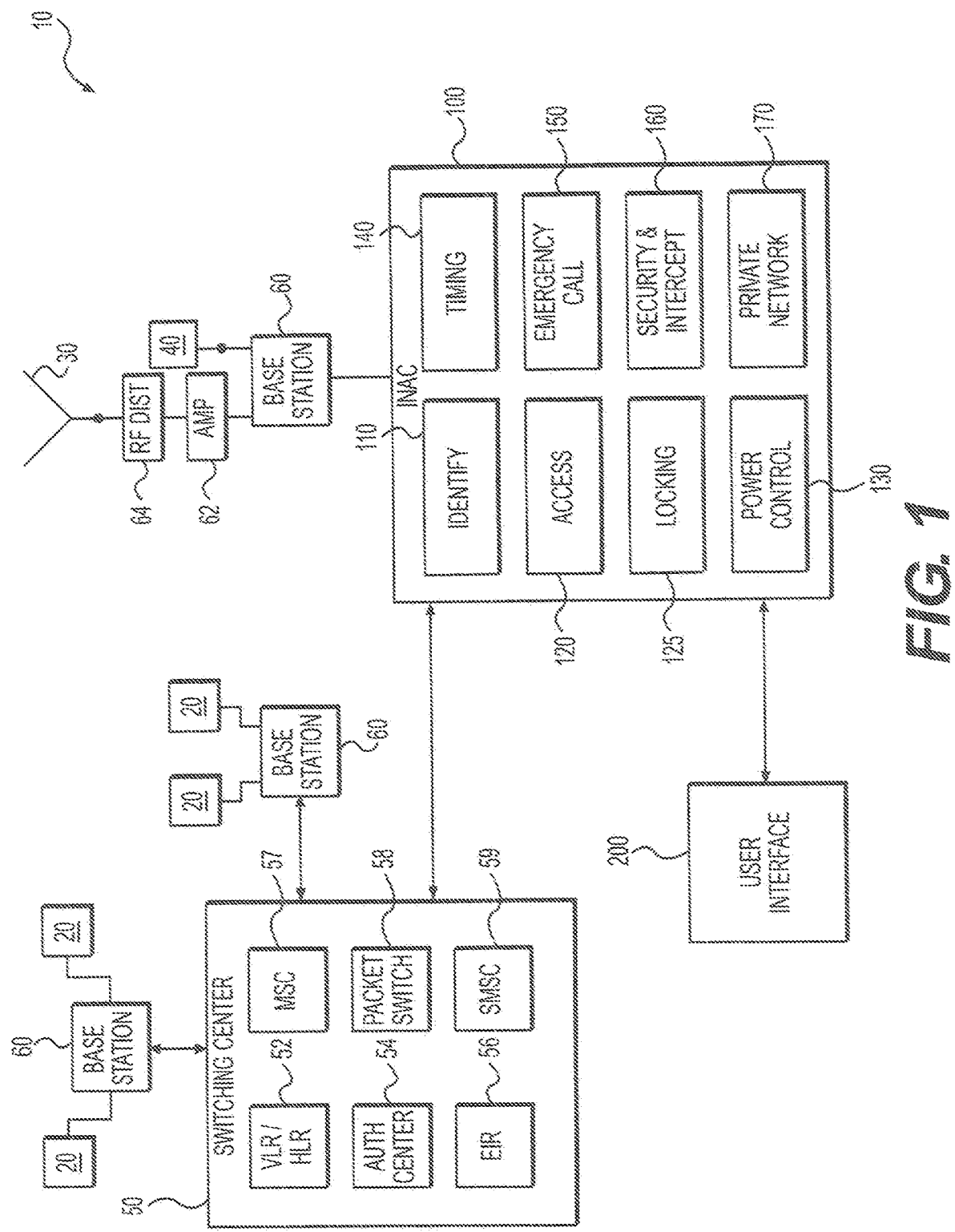
FIG. 1 is a block diagram of a wireless network incorporating an exemplary intelligent network access controller.

To overcome these limitations with current art wireless communication access restriction solutions, disclosed herein is an intelligent network access controller, shown in FIG. 1, and accompanying methods, which are shown in FIGS. 6A-6D, that either permanently or temporarily limits allowable communications on an existing wireless network to only a subset of that network's normal users. Those users not in the subset of allowable users are blocked from access to the wireless network when located in a specified area normally covered by the wireless network and/or for a specified time.

The intelligent network access controller provides, on a single platform, the necessary components for an end-to-end solution for selective communications restriction across the spectrum of wireless technology, frequency, and access methodology. In an embodiment, wireless users are classified into categories and either allowed to access the wireless networks or are prohibited access, on a subscriber-by-subscriber basis. The intelligent network access controller meets the criteria of service restriction that may be required in specific areas, while allowing selected individuals wireless communications access to wireless networks in those same areas. Thus, the intelligent network access controller eliminates the need to overlay additional communications systems to provide targeted localized wireless communications. The intelligent network access controller implements its service across both commercial as well as private wireless networks.

The intelligent network access controller is particularly useful in certain permanent facilities such as embassies, government facilities, prisons, military installations, stadiums and arenas, hospitals, public transportation facilities, landmarks, and in temporary applications including disaster recovery operations and homeland security operations. In short, the intelligent network access controller can be used in any situation or at any facility or locale to establish a controlled wireless communications environment whereby only selected individuals can access a wireless communications network.

Figure 6A:
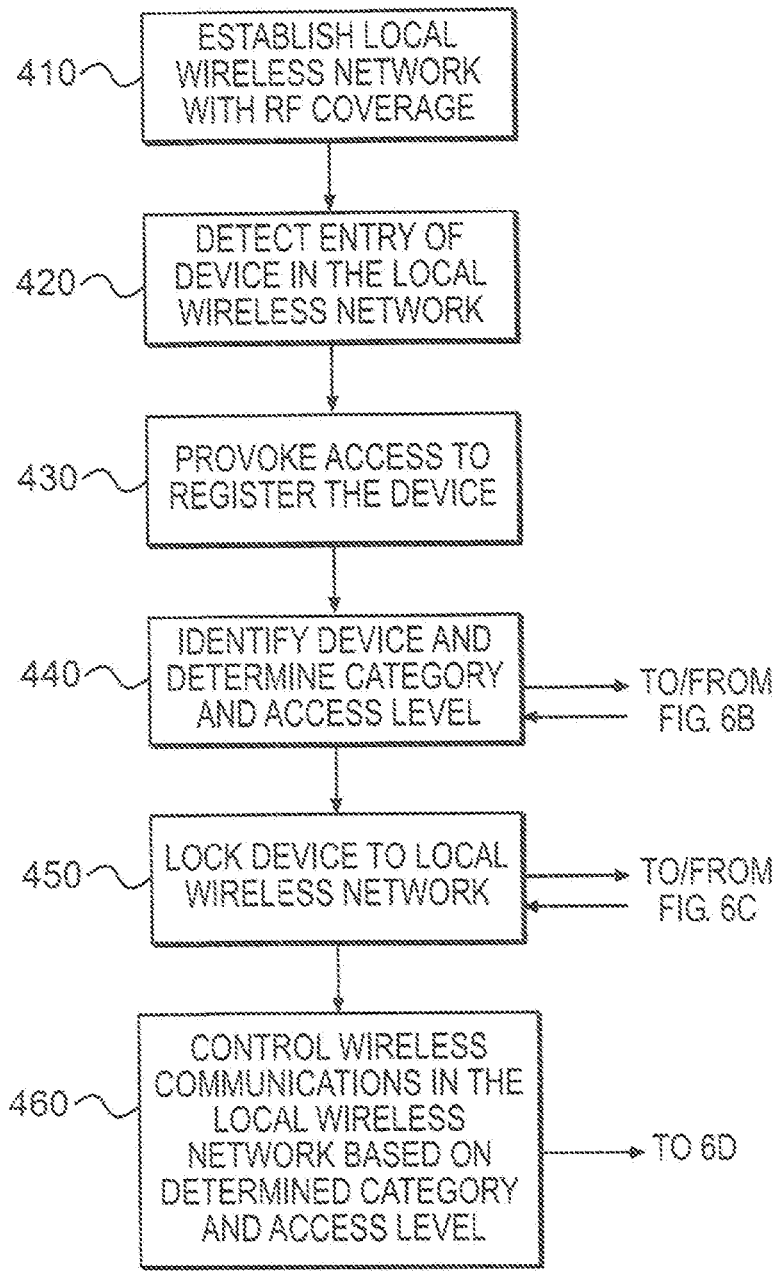
FIGS. 6A-6D illustrate an embodiment of a method for creating a local wireless network and for controlling wireless communications using the local wireless network.

FIG. 1 is a block diagram of a wireless communications network that incorporates an exemplary intelligent network access controller and other wireless network components to provide access restriction features. In FIG. 1, wireless network 10 includes switching center 50 and base stations 60, through which devices 20 establish wireless communications. Overlaying the network 10 are directional antennae 30 and repeaters 40 that operate in conjunction with intelligent network access controller (INAC) 100, to restrict or to allow wireless communication from and to selected devices 20. The switching center 50 includes standard components that may be found in any switching center, including a VLR and an HLR 52, authentication center 54, equipment identification register 56, a mobile switching center (MSC) 57, a packet switch 58 and a short message service center (SMSC) 59. Ordinarily, a subscriber using a device 20 would have that device 20 registered with the network 10 once the device 20 was within the coverage area of the network 10. However, to provide access restriction on either a temporary or a permanent basis, the INAC 100, and associated interface 200, which facilitates human operator interaction with the controller 100, may be used to "lock" selected devices 20 to the INAC 100, the method of which is shown in FIG. 6A, block 450, and thus prevent access to the wireless network 10.

"Locking" the wireless devices to the INAC 100 indicates that the wireless device 20 is tuned to and has been accepted by the local signal broadcast of the INAC 100. The INAC 100 implements a mimicked signal that may follow the signal patterns, parameters, and characteristics of the underlying wireless network; however, the localized signal is only connected to the INAC 100 and not the wireless network as a whole. The end result is a wireless device that has the appearance of operating on the wireless network; however by virtue of the wireless device 20 being tuned to the local INAC 100 signal, the wireless device 20 is by default "locked" from access to the wireless network outside the coverage area of the INAC 100.

A "device" or "wireless device" includes any wireless access mechanism including wireless handheld devices used for communications and laptop computers, personal digital assistants, or other computing device that includes wireless access technology.

A "wireless network" includes networks that provide commercial or private wireless access for voice, text, and or data access.

The INAC 100 may be implemented as an adjunct to the wireless network 10, as an integrated feature within the wireless network, or may be implemented as a standalone device that is independent of any specific wireless network.

The INAC 100 may be implemented as software, hardware, or a combination of hardware and software. The INAC 100 may be implemented on a suitably programmable processor.

Figure 6B:
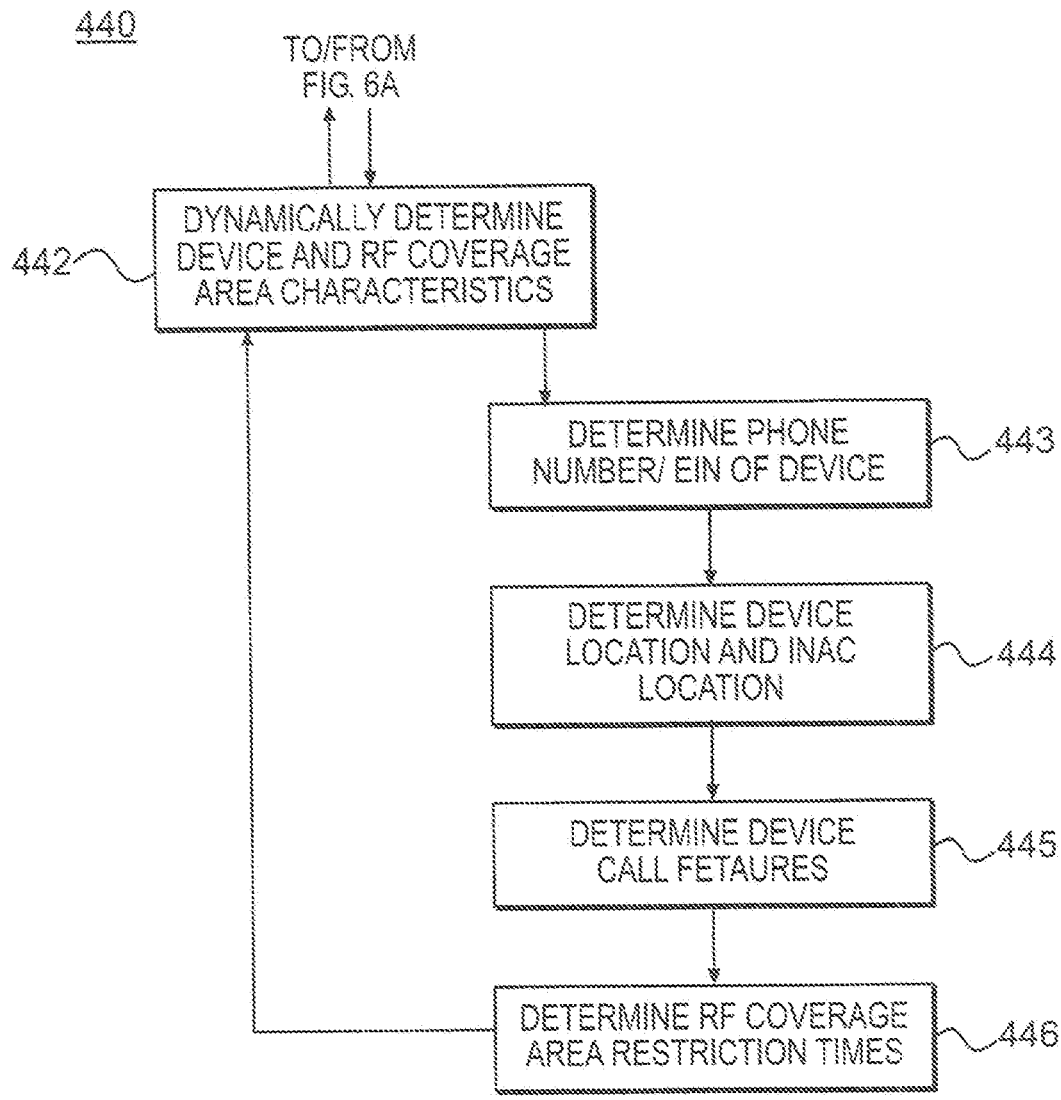
Figure 6C:
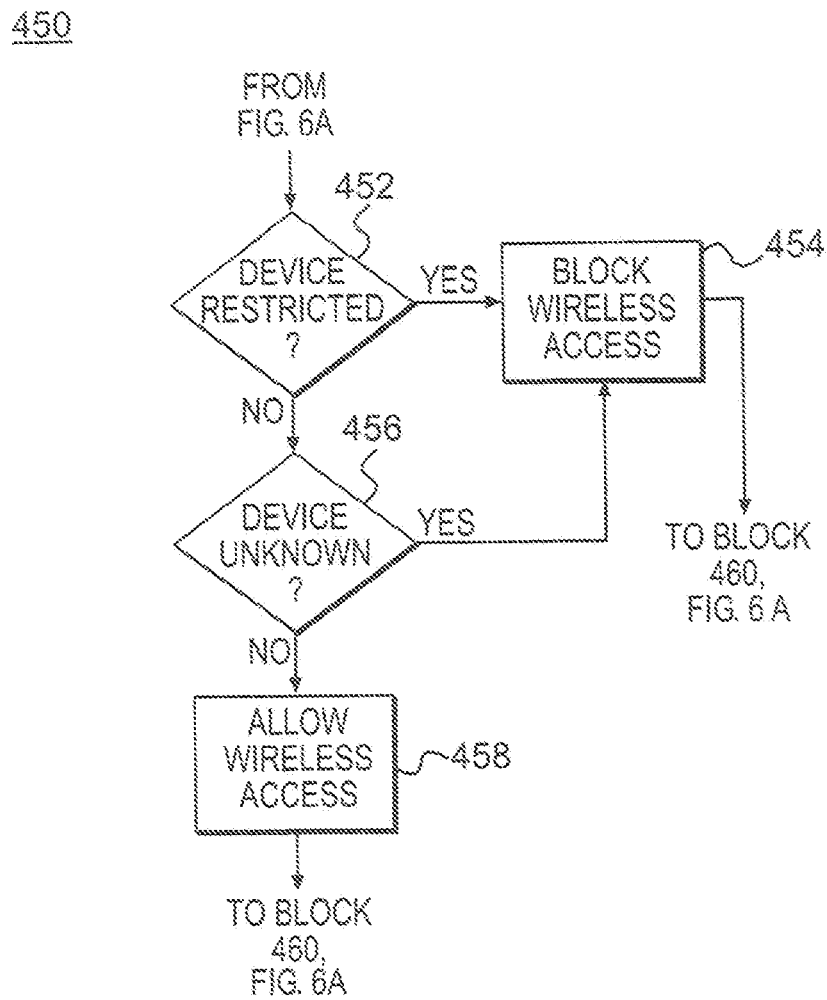
Figure 6D:
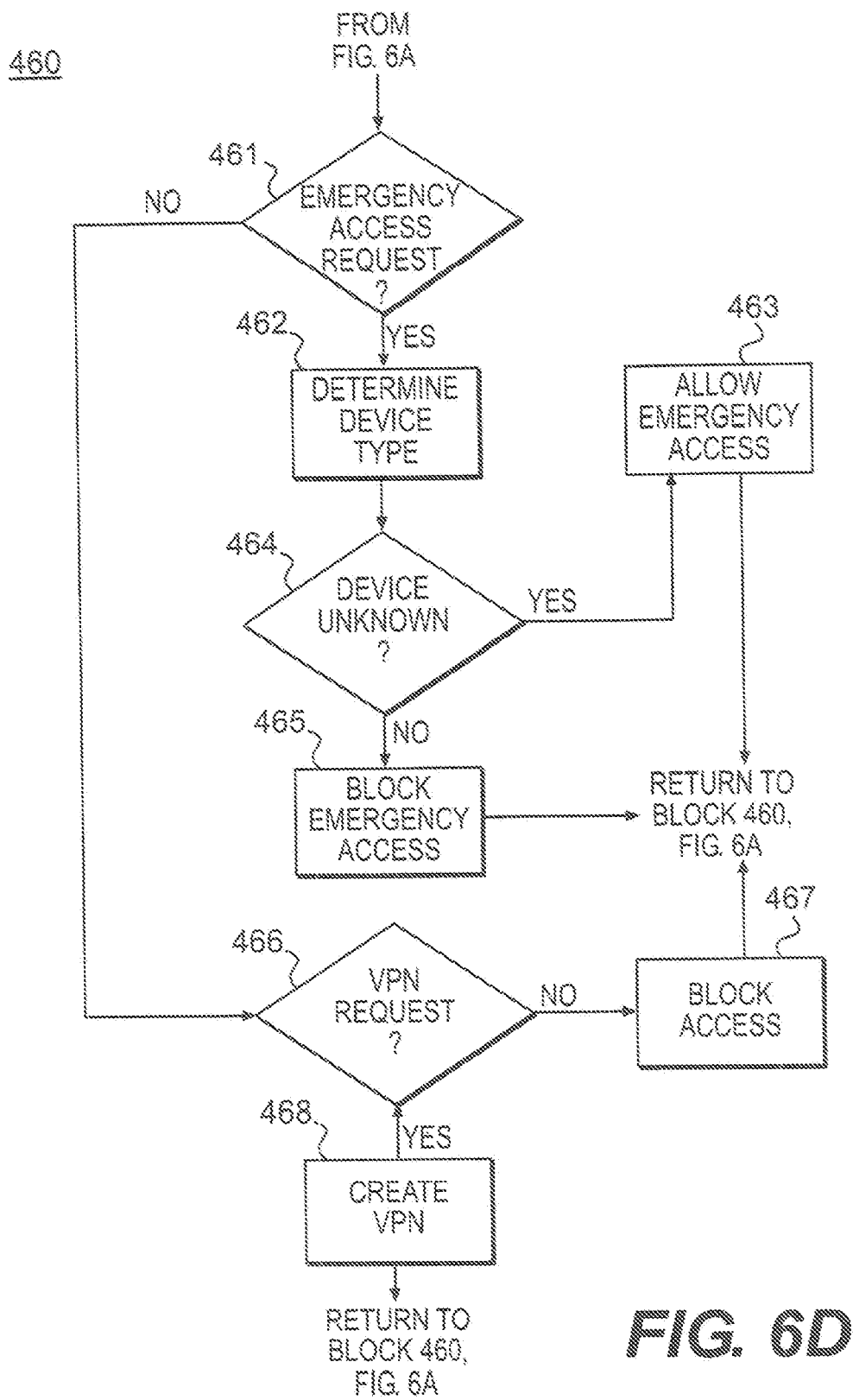

The INAC 100 includes equipment identity module 110 that receives and stores identifying information associated with devices 20, the method of which is shown in FIG. 6B, block 443; access module 120 that determines, based on setup or operational mode of the INAC 100, which of the devices 20 are to be allowed access to the wireless communications network 10; locking module 125, which is used to lock a device 20 to the INAC 100 and to provide indications to the locked device 20 that make it appear that the device 20 actually is registered with the wireless network 10; power control module 130, which operates in conjunction with base station 60, RF distribution equipment 62, amplifiers 64 directional antennae 30 and repeaters 40 to establish, per FIG. 6A, block 410, the area subject to the access restrictions imposed by the INAC 100; timing module 140, which may be used to impose temporal limitations on the access restriction functions per FIG. 6B, block 446; and emergency access module 150, which operates as shown in FIG. 6D, blocks 461-465, to allow certain access types (e.g., emergency 911 calls from a wireless device 20) while other access types remain blocked.

The INAC 100 provides, as shown in FIG. 6A, block 440 and FIG. 6B, blocks 442-445, discretionary blocking of access to and from devices 20 by recognizing differences among the devices 20. In an embodiment, the INAC 100 recognizes three categories of subscriber devices 20: restricted, allowed, and unknown. Restricted devices are those that are identified as belonging to subscribers who are to be denied wireless access (e.g., prisoners, terrorists). Restricted devices are configured by the INAC 100 so as not to be allowed cellular service and access to the wireless network 10. Every device 20 has a unique identifying number or characteristic, which is determined as shown in FIG. 6A, block 440. If the device identifying number or characteristic (e.g., subscriber number) is configured to be "restricted," the INAC 100 accepts that device's access and returns a positive acknowledgement to the device per FIG. 6C, block 452. This creates the illusion, at the subscriber's device 20, that the subscriber has gained access to and is operating within the wireless network 10, when, in fact, the device 20 is locked to the INAC 100 until the device 20 is removed from the restricted access area imposed by the INAC 100. By locking the "restricted" device 20 to the INAC 100, all incoming and outgoing accesses by the device 20 are prevented while the "restricted" device 20 is within the restricted access area, the method of which is shown in FIG. 6C, blocks 452 and 454.

Allowed devices are those configured in the INAC 100 as to be allowed wireless service. After determining the identity of the device 20, and determining that the device 20 is an "allowed" device, the INAC 100 redirects the device 20 from the INAC 100 to the appropriate wireless network 10, as shown in FIG. 6C, block 458. This redirection forces the "allowed" device to reattempt access on the wireless network 10. Once so redirected, the "allowed" device's subscriber can use the device 20 for normal inbound and outbound traffic. See FIG. 6A, blocks 420, 440, 450, and 460.

Unknown devices 20 are those not specifically configured by the INAC 100 as allowed or restricted. Unknown devices 20 may be configured to allow normal wireless network access depending, for example, on a security level requirement at a given location (e.g., for homeland security threat conditions of orange and lower, unknown devices are allowed access to the wireless network 10), as shown in FIG. 6C, blocks 454 and 456.

The INAC 100 operates as a local overlay or underlay of the same frequency spectrum and configuration as the wireless network 10. The area of restricted access can extend to any part of the coverage area of the wireless network 10, and such restricted area may be enforced by the use of the power control module 130, directional antennae 30, and repeaters 40. Thus, the restricted area under control of the INAC 100 may be limited to a building, a sports stadium, or a geographical area, for example. The area of restricted wireless access is not necessarily static, and can be changed based on set criteria or at the discretion of a network operator. The end result is a targeted coverage area that can provide controlled and deterministic wireless communications access by subscribers. Once a restricted, or an unknown, subscriber's device 20 leaves the restricted access area, the subscriber's device 20 re-registers with the wireless network 10 and is no longer controlled (locked) by the INAC 100.

When the subscriber's device 20 is locked to the INAC 100, the locking module 125 operates to ensure that the device's display and apparent operation are the same as if the device 20 were registered with the wireless network 10. A subscriber who attempts to use a device 20 locked to the INAC 100 will see a failed access attempt, or similar warning. The subscriber's perception would likely then be that the device 20 was not receiving sufficient signal strength to enable wireless communications or the serving wireless network did not have the requisite capacity to service the access request. This further masks the purpose and operation of the INAC 100. Only after a repeated pattern of access denial is established would the typical subscriber discern the restricted access.

The INAC 100 can be configured to provide various levels of access depending on the configuration of the subscriber devices 20 and the level of security required for the access. The INAC's operational mode may be changed dynamically, either automatically, or manually. Automatic changes may be programmed using the interface 200. Examples of automatic changes are changes programmed into the INAC 100 based on time of day, day of week, or some other calendar-based criteria; the occurrence of a specific event (e.g., a concert); changes in threat levels (e.g., homeland security threat conditions—yellow, orange, etc.); and changes in an operational profile or physical location (of the INAC 100 or of the wireless device 20) (e.g., an aircraft descending below 10,000 feet, a ship entering port, a train arriving at a station). Manual changes may be implemented directly by a system operator by using the interface 200. For any of the modes of operation, the INAC 100 provides a logging mechanism to track all system access attempts and the resulting status. Additionally, the INAC 100 provides capability to view the existing database information including the allowed and restricted lists, system configuration, system statistics, and log of system activity.

Figure 2:
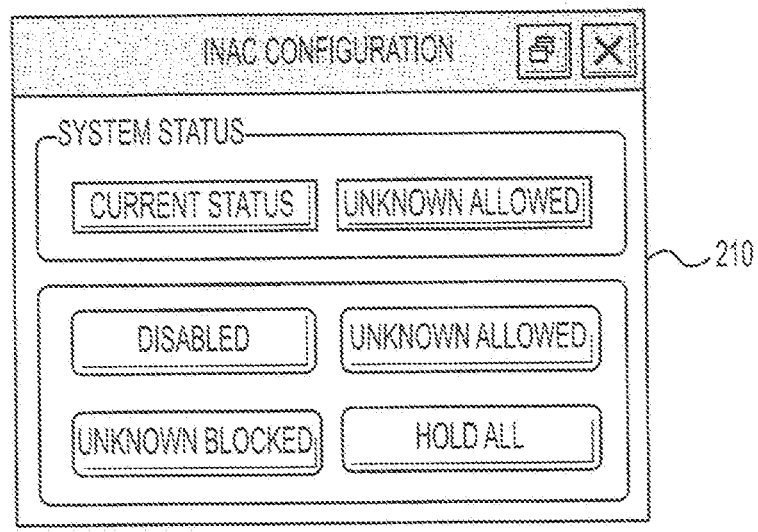
FIG. 2 illustrates an exemplary interface for enabling wireless access restrictions using the controller of FIG. 1.

The INAC's operational modes include disabled, wherein the access restrictions imposable by the INAC 100 are suspended; hold all, or virtual jam, wherein all wireless communications are processed as locked to the INAC 100; unknown allowed, wherein only known "restricted" devices are locked to the INAC 100; and unknown blocked, in which both restricted and unknown devices are locked to the INAC 100. FIG. 2 illustrates an exemplary interface 210 produced by the interface 200 and the INAC 100 for enabling wireless access restrictions. Additionally, the INAC 100 can also operate in a passive mode where all subscriber access is redirected to the appropriate wireless network.

As subscribers access the INAC 100, and either are locked to the INAC 100 or redirected to the wireless network 10, the INAC 100 captures access information that can be used to generate access reports for each type of device 20 (i.e., unknown, bad, or good). The reports provide an organized analysis as to which users are accessing the system, including time period, call duration, and frequency of use. The reports also provide useful information for establishing system databases and use of the INAC 100.

Figure 3:
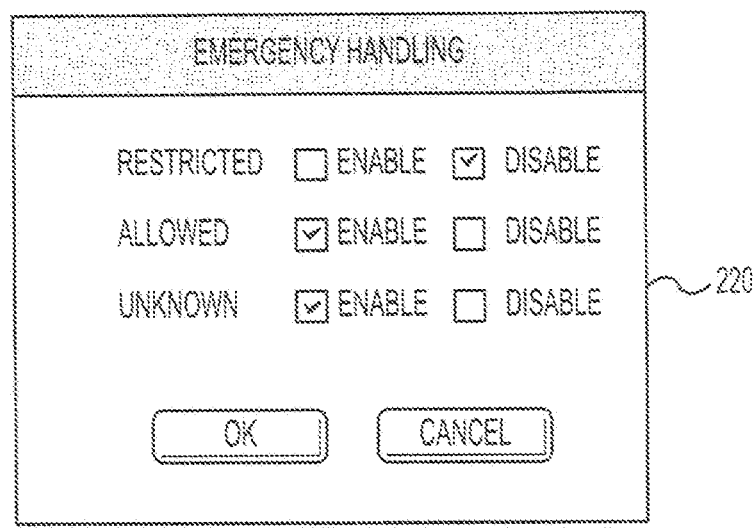
FIG. 3 illustrates an exemplary interface for enabling emergency access.

An optional feature of the INAC 100 is emergency access override to allow processing of emergency access, the method of which is shown in FIG. 6D, blocks 461-465. Depending on the type of installation and the security requirements, emergency access may need to be available, and thus may be enabled or disabled. Emergency access can be configured based on each type of subscriber device; restricted, allowed, or unknown. FIG. 3 is an interface 220 that allows a system operator to enable or disable emergency access for each of the three subscriber device types (restricted, allowed, and unknown). When emergency access is enabled, per FIG. 6D, blocks 461-465, the emergency access module 150 of the INAC 100 allows the subscriber's device 20 to be redirected to the wireless network 10 when that device 20 dials an emergency access number such as 911. Upon completion of the emergency access, the subscriber's device 20 returns to a locked to INAC condition, as appropriate. When emergency access is disabled, the INAC 100 ignores all call access from subscribers whose devices 20 are locked to the INAC 100.

The INAC 100 provides for location sensitive operations, an example of which, as noted above, involves an aircraft. The INAC 100 may be installed on an aircraft so that certain devices (e.g., those of crew members) may be used for wireless communications at any time. Alternatively, the INAC 100 may be used to control access to wireless communications based on the aircraft's location (latitude, longitude, and altitude) or any aspect or aircraft operation.

The INAC 100 may include an optional security and intercept module 160 that is used for lawful intercept of wireless communications using a direct Internet connection (or other available connection type) to a monitoring station. When enabled at the INAC 100, the security and intercept module 160 allows law enforcement personnel to monitor and record conversations and data transfers (packet and circuit), call signaling messages, accessed features, and SMS originated or terminated messages for targeted wireless devices that are currently locked to the INAC 100 and allowed localized services on the INAC 100 system.

There are many possible deployment options for the INAC 100. For example, the INAC 100 may be implemented as a permanent part of the wireless communications network 10. The INAC 100 also may be implemented as a standalone device that overlays one or more wireless communications networks so that all wireless communications in a specific location are capable of some form of access restriction. One example of this wireless feature is to establish an INAC 100 at a building, a facility, or a campus.

Installation of the INAC 100 as part of a network, or as a standalone device can be permanent or temporary. For example, the INAC 100 may be available as a mobile device, along with the necessary amplifiers, RF distribution, antennae and repeaters, so that a disaster recovery operation may invoke wireless access restrictions in the area where the disaster recovery is taking place. Upon completion of the disaster recovery operations, the access limitation area is disestablished.

When the INAC 100 operates to restrict wireless communications by way of a wireless network, there may still be a need to provide some form of private network communications in the wireless access limited area, the method of which is shown in FIG. 6D, blocks 466-468. To provide this additional functionality, the INAC 100 may include a private network module 170 that allows for limited wireless voice communications using either a commercial technology such as GSM or CDMA, or voice over IP (VoIP) technology, including session initiated protocol/unlicensed mobile access (SIP/UMA). As additional wireless technologies become viable, these can be added to the private network solution as well. The private network module 170 also allows for connection to a PBX or PSTN.

The INAC 100 may also provide the capability to individually access the locked wireless devices overtly or covertly thus allowing the exchange of information or enabling the ability to provoke action from the wireless device.

Figure 4:
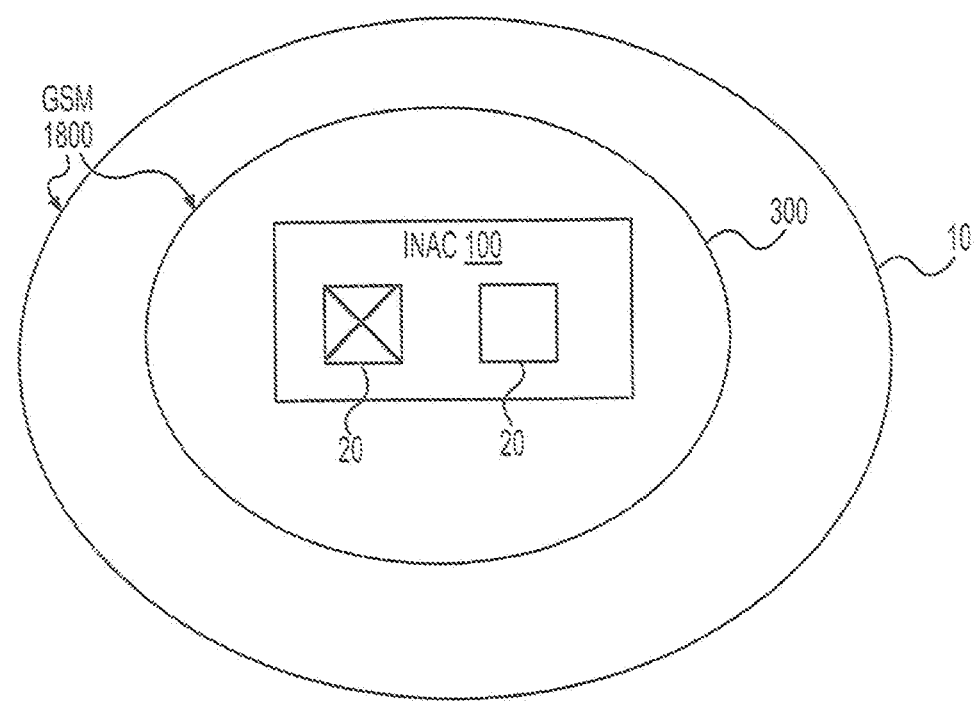
FIG. 4 illustrates a single technology implementation of the controller of FIG. 1.
Figure 5:
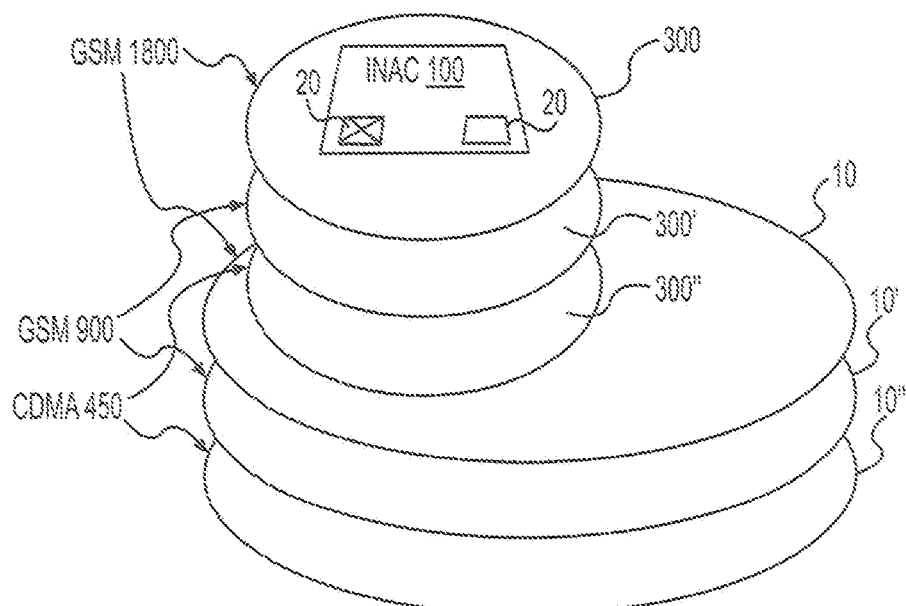
FIG. 5 illustrates a multiple technology implementation of the controller of FIG. 1.

As noted above, the INAC 100 may be used to control wireless access for one wireless technology, and/or for one frequency range, or for multiple technologies and frequency ranges. FIGS. 4 and 5 show this functionality, with examples of current wireless protocols illustrated. One skilled in the art will appreciate that other protocols would apply equally, including wireless protocols to be developed in the future. In FIG. 4, the INAC 100 is used to create restricted wireless access area 300 as an overly to wireless network 10, where the wireless network 10 and the restricted access area 300 are based on GSM 1800 protocols. In FIG. 5, three wireless technologies are shown and, correspondingly, three restricted access areas (300, 300', 300"). In a further alternative, the INAC 100 may be used to create restricted access areas for only a subset of the protocols of a multi-protocol wireless network.

FIGS. 6A-6D illustrate an embodiment of a method for creating a local wireless network and for controlling wireless communications using the local wireless network.

We claim:

1. A wireless communications system operating in a portion of a coverage area of a wireless network, the portion having a boundary comprising;
   a radiofrequency (RF) front end, comprising:
      a base station,
      an RF antenna,
      RF distribution equipment, and
      an RF amplifier, the
   (RF) front end intercepting and processing wireless transmissions from wireless devices within the boundary of the portion of the coverage area, the base station receiving the processed wireless transmissions from the RF amplifier, and
   a non-transitory computer readable storage medium having encoded thereon an Intelligent Network Access Controller (INAC) comprising a program of machine instructions executable by an INAC processor, the INAC processor in signal communication with the base station, the INAC processor executing the instructions to:
   control with the base station to create the portion of the coverage area of the wireless network; and
   establish a local wireless overlay in the portion of the coverage area of the wireless network in which the INAC processor, by executing the machine instructions, controls wireless communications in the created portion, comprising the INAC processor:
      receiving from the base station, the processed wireless transmissions,
      further processing the wireless transmissions to determine a characteristic of the wireless devices,
      determining, based on the characteristic, whether the wireless devices are allowed to continue transmissions in the portion of the coverage area of the wireless network,
      cooperating with the base station to lock, and maintain locked to the INAC processor, a first wireless device for which continued transmissions are not allowed, and
      cooperating with the base station to initially lock a second wireless device for which continued transmissions are allowed to the INAC processor and then direct the second wireless device to reattempt access to the wireless network.

2. The wireless communications system of claim 1, wherein the characteristic is a unique identifying number of a wireless device, and wherein a first transmission is an access request transmission.

3. The wireless communications system of claim 2, wherein to determine, based on the characteristic, whether the wireless device is allowed to continue transmissions in the wireless network, the processor compares the unique identifying number to a list of allowed wireless devices and restricted wireless devices, and allows access only for allowed wireless devices.

4. The wireless communications system of claim 3, wherein to determine, based on the characteristic, whether the wireless device is allowed to continue transmissions in the wireless network, the processor determines the wireless devices is an unknown wireless device, and wherein the processor controls the base station to lock the unknown wireless device to the base station.

5. The wireless communications system of claim 4, wherein the processor controls the base station to return a positive acknowledgement to the restricted wireless device and the unknown wireless device thereby creating an illusion of connection to the wireless network.

6. The wireless communications system of claim 3, wherein to determine, based on the characteristic, whether the wireless device is allowed to continue transmissions in the wireless network, the processor determines the wireless devices is an unknown wireless device, and wherein the processor controls the base station to redirect the unknown wireless device to reattempt access to the wireless network.

7. The wireless communications system of claim 1, wherein the portion is less than an entire coverage area of the wireless network.

8. The wireless communications system of claim 1, wherein the transmission is a registration signal.

9. The wireless communications system of claim 1, wherein the processor directs the base station to generate and broadcast a mimicked signal that follows signal patterns and parameters of the wireless network.

10. A system for detecting and controlling transmissions from wireless devices operating in a portion of a coverage area of a wireless network, comprising:
a radiofrequency (RF) front end comprising RF transmission equipment and a base station coupled to the RF transmission equipment; and
a non-transitory, computer-readable storage medium having encoded thereon an Intelligent Network Access Controller (INAC) program comprising machine instructions executable by an INAC processor in signal communication with the base station, wherein the processor executes the instructions to:
control the base station and RF transmission equipment to generate the portion of the coverage area,
control the base station and RF transmission equipment to generate and broadcast a mimicked signal that follows signal patterns and parameters of the wireless network,
process signal data received at the base station from a wireless device operating in the portion of the coverage area to determine an identity of the wireless device,
using the identity, determine the wireless device is one of allowed, restricted, and unknown, and
prevent further transmissions from wireless devices determined as restricted by locking the restricted wireless device to the INAC processor.

11. The system of claim 10 comprising the processor, in response to predetermined criteria, changing a characteristic of the portion of the coverage area,
wherein the predetermined criteria comprise one or more of calendar-based criteria, including day and time of day; event-based criteria, including specific events; threat level-based criteria, including homeland security threat conditions; and operational profile and location-based criteria, including movement of an aircraft, ship, or train; and
wherein the characteristic comprises one or more of a boundary of the portion of the coverage area; allowed types of communication in the portion of the coverage area, including voice, SMS, and data communication; and emergency access.

12. The system of claim 10, wherein the identity is a unique identifying number of the wireless device.

13. The system of claim 12, wherein to determine based on the identity, whether the wireless device is allowed to continue transmissions in the wireless network, the processor compares the unique identifying number to a list of allowed wireless devices and restricted wireless devices, and allows access only for wireless devices listed as allowed wireless devices.

14. The system of claim 13, wherein the processor allows further transmissions from the wireless device determined as allowed by controlling the base station and RF front end to broadcast a redirect signal to redirect the allowed wireless device to reattempt access to the wireless network.

15. A non-transitory computer-readable storage medium having encoded thereon, machine instructions for controlling communications in a wireless communications network, the instructions, when executed by a processor of an Intelligent Network Access Controller (INAC), causing the processor to:
control a radio frequency (RF) front end comprising a base station to create in a portion of a coverage area of the wireless communications network, a local wireless overlay, and to control wireless communications in the portion of the coverage area of the wireless communications network by operating to:
receive from the base station, signals data received by the base station in a transmission from a wireless device operating in the portion of the coverage area of the wireless communications network;
process the received signals data to determine a characteristic of the wireless device;
determine, based on the characteristic, whether the wireless device is allowed to continue transmissions in the portion of the coverage area of the wireless communications network;
control the base station to lock wireless devices to the INAC to prevent continued transmissions by the wireless devices when continued transmissions are not allowed in the portion of the coverage area; and
redirect wireless devices to attempt access to the wireless communications network when continued transmissions are allowed in the portion of the coverage area.

16. The non-transitory computer-readable storage medium of claim 15, wherein the characteristic is a unique identifying number of the wireless device.

17. The non-transitory computer-readable storage medium of claim 16, wherein to determine, based on the characteristic, whether the wireless device is allowed to continue transmissions in the wireless communications network, the processor compares the unique identifying number to a list of allowed wireless devices and restricted wireless devices, and allows access only for allowed wireless devices.

18. The non-transitory computer-readable storage medium of claim 17, wherein to determine, based on the characteristic, whether the wireless device is allowed to continue transmissions in the wireless communications network, the processor determines the wireless devices is an unknown wireless device, and wherein the processor controls the base station to lock the unknown wireless device to the base station.

19. The non-transitory computer-readable storage medium of 18, wherein the processor controls the base station to return a positive acknowledgement to the restricted wireless device and the unknown wireless device thereby creating an illusion of connection to the wireless communications network.

20. The non-transitory computer-readable storage medium of claim 16, wherein to determine, based on the characteristic, whether the wireless device is allowed to continue transmissions in the wireless communications network, the processor determines the wireless devices is an unknown wireless device, and wherein the processor controls the base station to redirect the unknown wireless device to reattempt access to the wireless communications network.

* * * * *